US011172670B2

(12) United States Patent
Round (10) Patent No.: US 11,172,670 B2
(45) Date of Patent: Nov. 16, 2021

(54) ANIMAL SORTING DEVICE (71) Applicant: ITRAP TECHNOLOGIES LIMITED, West Sussex (GB)

(72) Inventor: Jonathan Round, South Yorkshire (GB)

(73) Assignee: ITRAP TECHNOLOGIES LIMITED, West Sussex (GB)

( * ) Notice: Subject to any disclaimer, the term of this patent is extended or adjusted under 35 U.S.C. 154(b) by 710 days.

(21) Appl. No.: 15/775,367

(22) PCT Filed: Nov. 9, 2016

(86) PCT No.: PCT/GB2016/000200
§ 371 (c)(1),
(2) Date: Oct. 9, 2018

(87) PCT Pub. No.: WO2017/081432
PCT Pub. Date: May 18, 2017

(65) Prior Publication Data
US 2018/0325092 A1    Nov. 15, 2018

(30) Foreign Application Priority Data

Nov. 10, 2015 (GB) .................................. 1519845
Dec. 16, 2015 (GB) .................................. 1522229

(51) Int. Cl.
*A01M 23/00* (2006.01)
*A01M 23/12* (2006.01)
(Continued)

(52) U.S. Cl.
CPC ............ *A01M 23/12* (2013.01); *A01M 23/38* (2013.01); *A01M 31/002* (2013.01); *A01M 23/14* (2013.01)

(58) Field of Classification Search
CPC ...... A01M 23/00; A01M 23/02; A01M 23/04; A01M 23/08; A01M 23/10; A01M 23/12;
(Continued)

(56) References Cited

U.S. PATENT DOCUMENTS 4,138,968 A    2/1979  Ostermann
5,953,853 A    9/1999  Kim
(Continued)

FOREIGN PATENT DOCUMENTS

CA         2621101        5/2008
WO   WO 2004/030450 A2   4/2004
(Continued)

OTHER PUBLICATIONS

International Patent Application No. PCT/GB2016/000200; Int'l Written Opinion and the Search Report; dated Mar. 2, 2017; 12 pages.
(Continued)

*Primary Examiner* — Richard T Price, Jr.
(74) *Attorney, Agent, or Firm* — BakerHostetler (57) ABSTRACT

An animal sorting device comprising a housing having an entrance, an exit, and an animal dispatch chamber. The animal dispatch chamber comprises entrant assessment means to determine if an entrant is either a pest or a non-pest, animal dispatching means to dispatch the pest, and means to urge either a dispatched pest towards an aperture or the non-pest towards the exit. A modular animal sorting device is also disclosed.

13 Claims, 10 Drawing Sheets

(51) Int. Cl.
*A01M 23/38* (2006.01)
*A01M 31/00* (2006.01)
*A01M 23/14* (2006.01)

(58) Field of Classification Search
CPC ...... A01M 23/14; A01M 23/16; A01M 23/38;
A01M 1/026; A01M 1/02; A01M 31/002
USPC ............................................................ 43/60
See application file for complete search history.

(56) References Cited

U.S. PATENT DOCUMENTS

| | | | | |
|---|---|---|---|---|
| 6,016,623 | A | * | 1/2000 | Celestine .............. A01M 23/04 43/61 |
| 2005/0235553 | A1 | | 10/2005 | Rail |
| 2018/0125052 | A1 | * | 5/2018 | Johnson ................ A01M 1/026 |
| 2020/0323193 | A1 | * | 10/2020 | King .................... G06K 9/6262 |

FOREIGN PATENT DOCUMENTS

| WO | 2004089079 | 10/2004 |
|---|---|---|
| WO | WO 2013/177652 A1 | 12/2013 |
| WO | 2014024052 | 2/2014 |
| WO | WO 2016/028219 A1 | 2/2016 |

OTHER PUBLICATIONS

Great Britain Patent Application No. 1522229.2; Combined Search and Exam Report; dated May 27, 2016; 7 pages.

* cited by examiner

ANIMAL SORTING DEVICE

FIELD OF THE INVENTION

The present invention relates to an animal sorting and dispatch device.

BACKGROUND OF THE INVENTION

Pest control is an increasingly important issue with, for example, rat populations forecast to increase exponentially over the coming years.

Current solutions focus on the use of poisoned bait. Whilst both inexpensive, and easy to implement, the ongoing use of poisons has inadvertently resulted in a number of pests developing immunity, particularly rats. This results in new and still deadlier poisons being used instead.

The use of poisons has a number of associated problems. The use of any noxious substance in dense urban areas (where pest populations are often at their highest) is not ideal and increases the risk of vulnerable persons coming into contact with the poisons, such as children as well as domestic pets.

Poisons are not instantaneous and can lead to prolonged animal suffering. A side effect of this is a poisoned animal may crawl into an inaccessible space and slowly decay resulting in unpleasant noxious odors.

Furthermore, poisons are not selective and target all species, whether a pest, non-pest, or protected species. The impact on the food chain must also be considered as many prey species may consume poisons, such as mice and voles which are in turn consumed by higher predators such as owls, other birds of prey and domestic cats.

The use of mechanical traps is well known. However, these suffer from similar problems to poisoned baits. A simple trap is non-selective, is a risk to vulnerable persons nearby, and easily avoided by adaptive pests. Such traps need to be constantly checked, reset, and maintained to be effective. This is an uneconomical solution.

The use of electrocution traps is also known. However, these suffer from similar problems to mechanical traps and poisons too. They are not selective and dispatched pests must be cleared from the mechanism.

SUMMARY OF THE INVENTION

According to a first aspect of the present invention, there is provided an animal sorting device comprising; a housing having an entrance, an exit, and an animal dispatch chamber, wherein the animal dispatch chamber comprises; entrant assessment means to determine if an entrant is either a pest or a non-pest; and animal dispatching means to dispatch the pest; and means to urge either; a dispatched pest towards an aperture or the non-pest towards the exit. This ensures that the device targets specific pests and rejects any entrant that the device identifies as a non-pest. All non-pests are ejected from the device by the means to urge. A target pest is contained, dispatched, and then the body is ejected from the dispatch mechanism and out of the device or into an internal storage compartment. The entrance, exit, and aperture may be one and the same, i.e. an animal enters through a void, is assessed and then either rejected or dispatched, and ejected through the same void.

The urging means suitably comprises a motor connected to at least one paddle. This ensures that the ejection means is an active system and prevents a non-pest creature from dwelling in the trap and keeping target creatures from entering. Alternatively, a motorised paddle ensures that any dispatched creatures (pests) are immediately and effectively cleared from the kill zone such that the trap may be readied to receive a subsequent entrant. This also minimises the likelihood that a subsequent entrant will be able to sense that creatures have perished in the dispatch mechanism previously.

The at least one paddle suitably has a lateral motion of travel. Alternatively, the at least one paddle has a rotatory motion of travel. Advantageously these modes of paddle travel allow the pest trap to be designed to allow an entrant to be shoved by the paddle to the left or right in the case of a lateral moving paddle, or turned a number of degrees by a rotational paddle. Such movements are useful for the design of traps to fit in a particular space. A rotating paddle lends itself to a cylindrical trap which may be fitted in pipes. Lateral motion paddles lend themselves for use in cuboidal traps which may be intended for use in discrete locations or ducting.

The entrant assessment means advantageously compares a characteristic of the entrant against a determining value. The determining value suitably may be adjusted. The device compares a creature that has entered the trap against a known value. The value is determinative of the type of creature that has entered. By allowing the value to be adjustable, an end user may fine tune the trap to target specific species. By way of non-limitative example, the device could be set to dispatch only adult rats over a certain weight.

The entrant assessment means is preferably a weighing scales. Weight is one example of a deterministic value. Weighing scales are effective at determining the difference between an adult rat compared to smaller protected species such as voles. Weight may be easily determined through the use of inexpensive and energy efficient piezoelectric sensors.

The dispatching means is advantageously an electrified plate. Electrocution traps have significant advantages over mechanical traps. Electrical traps dispatch pests but maintain the carcass as a single entity whereas a mechanical trap may cause the corpse to rupture leading to excessive mess that needs to be cleaned or acts as a deterrent to further pests entering the trap. An electrical trap may be easily reset for subsequent kills or to administer multiple shocks to ensure that the target is deceased.

The animal sorting device is preferably suspended immediately below a subterranean entrance. One such example is a sewer entrance, below a manhole cover. The sewers are a popular home for pests and therefore it is advantageous to be able to deploy a trap in such environments. Allowing the trap to be mounted immediately below a manhole cover allows for easy access and maintenance by a technician.

The aperture is advantageously connected to a collection vessel. Dispatched pests may be collected in the vessel and safely disposed of, as opposed to the device ejecting a corpse into the surrounding environment. The vessel may be an incorporated element of the device such as a drawer or hopper. Alternatively, the vessel could be an external tank or sack to allow easy removal and replacement.

The animal dispatching means, entrant assessment means, and means to urge are preferably controlled by at least one microcontroller. The use of a microcontroller allows the device to be programmed and implement a range of extra features.

The at least one microcontroller suitably comprises;
 a. a microprocessor;
 b. a movement sensor;
 c. a settable weighing system;

d. a network connection; and e. a settable animal dispatching means controller.

The microprocessor interprets incoming signal and provides a response. The movement sensor is able to detect an entrant to the trap. The settable weighing system weighs the entrant and provides a reading. The settable animal dispatching means controller receives the weight reading and then dispatches the entrant accordingly. A network connection allows data from any of the components to be communicated to any interested party such as a service technician.

The at least one microcontroller preferably further comprises a plurality of sensors detecting at least one condition of the animal sorting device. The sensors are able to detect and communicate positive indications of the following: the presence of an entrant, the location of the entrant in the device, whether the entrance, exit, or aperture are clear, the correct functioning of the means to urge the entrant, the available capacity of the vessel, battery charge, or if the housing is open (for service).

Following a first run cycle, preferably the at least one microcontroller resets the animal sorting device ready to commence a plurality of subsequent run cycles. Without the attendance of the trapper, the device is able to clean and prime itself to continue to provide pest control for a prolonged period of time without external assistance.

The at least one microcontroller suitably adjusts aperture blocks at least at the entrance, exit and aperture from a first open position to a closed second position prior to the animal dispatching means dispatching the pest. This prevents the pest from escaping the device or a second entrant immediately entering the device. The pest is retained until it is successfully dispatched.

Advantageously, upon at least one of the plurality of sensors detecting at least one fault with the at least one condition of the animal sorting device, the at least one microcontroller adjusts aperture blocks at least at the entrance, exit and aperture from a first open position to a closed second position. This prevents an entrant gaining access to a malfunctioning device and causing further damage. This function also makes the trap safe in case any vulnerable person encounters the device.

The microcontroller suitably instructs the settable animal dispatching means controller to disarm the animal dispatching means. This prevents the device from administering an electric shock if, for example, the sensors detect the housing is open for maintenance.

The network connection is preferably a GSM modem. A GSM modem may be used anywhere a signal may be received and does not require cabling to be run to the location of the device which may be remote.

The settable animal dispatching means controller suitably comprises a variable voltage high tension coil. The high tension coil is able to generate a high voltage electric shock suitable for dispatching the target pest.

In a second embodiment of the present invention there is provided a modular animal sorting device comprising at least the following modules; a control module, and a combined sorting/dispatching module. A modular form allows the device to be easily or selectively dismantled and elements removed for servicing or directly replaced to get the device up and running efficiently.

The modular animal sorting device preferably further comprises a hopper module and/or a bait module. A separate hopper module allows carcasses to be collected and safely disposed of. Hoppers may be swapped and therefore prevent the service technician contacting the contents. A bait module allows the bait to be easily refreshed without requiring complete removal of the device from its location.

Other aspects are as set out in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE EMBODIMENTS

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Figure 1:
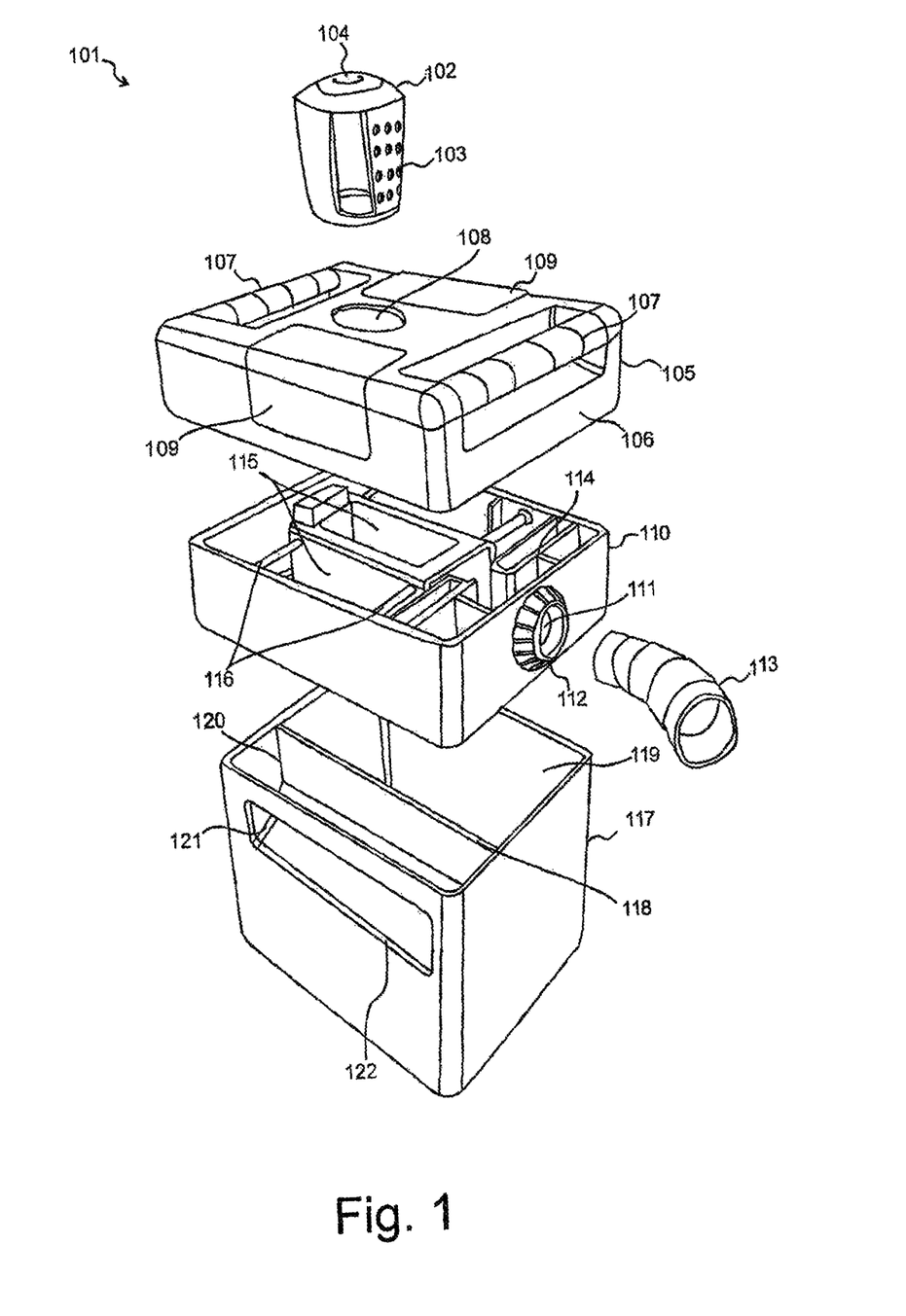
FIG. 1 depicts an exploded view of a first embodiment of the present invention.

With reference to FIG. 1 there is provided an animal sorting device 101 comprising a bait module 102 comprising a cylindrical housing with enclosed top and bottom. A fenestrated door 102 encloses part of a side wall of the bait module. The fenestrations allow the scent of a bait located within the chamber to permeate through the device to attract and nearby target creatures. The door 103 may be sufficiently stiff or comprise a latch so as to prevent any creatures that encounter the bait module 102 from opening the door 103 and devouring the bait. The door 103 suitably slides about the circumference of the cylindrical bait chamber 102 or alternatively the door 103 may swing open on hinges.

A bullseye spirit level 104 is located on a top of the bait module to facilitate device installation insuring the device 101 is level. It will be apparent to one skilled in the art any suitable leveling device may be substituted.

The bait module 102 is designed to be received by a componentry module 105. The componentry module 105 comprises a substantially cuboidal housing 106 with recesses to accept handles 107 which facilitate device handling and placement. The handles 107 may be replaced with a pole such that the device 101 may be suspended in a subterranean environment such as a sewer. The pole may be a single piece that is cut to length and fitted into mounted wall sockets at either end or alternatively the pole may be telescopic with a compression fit mechanism to clamp each end of the pole against a respective wall.

The housing 106 of the componentry module 105 further comprises at least one aperture 108 to receive the bait module and allow a service technician to inspect and maintain the internal components of the componentry module 105. These apertures may covered by service hatches 109 which require removal prior to inspection.

The componentry housing 106 is sealed to prevent environmental ingress such as water or animals and insects. This prevents damage to the internal components. The internal components include a battery, control circuit board (discussed later), fan and any other appropriate electrical components such as sensors.

The battery may be any suitable for providing power sufficient for the device to operate without a service for at least two weeks. The battery may be single use or rechargeable and of any suitable chemistry including but not limited to lead acid, lithium ion, NiCad, NiMH or zinc chloride. Alternatively, should suitable facilities be available in the environment, the device 101 may dispense with the battery and be powered from an external source such as a mains power supply. The battery is removeably attached to the other components in order to allow a technician to remove and replace or service the battery.

A fan is included in the componentry module 105 to provide a through flow of air about and through the bait chamber 102, the dispatching module 110, and out to the surrounding environment. This air flow carries the scent of the bait held within the dispatching chamber 102 and facilitates the attraction of any nearby creatures into the device 101. The fan may be set to operate continuously, at peak activity of a target species (such as at dawn and dusk only), or any other suitable interval as determined by the end user.

A plurality of internal sensors may be included in the device 101 to monitor the condition and correct functioning of components within the componentry module 105 and act as a fail safe. When an inspection hatch 109 of the componentry module 105 is opened a door open sensor may be triggered which signals to the control circuit to disconnect power from all the internal components and making the device safe for inspection. A resistivity sensor may be included to monitor the correct functioning of the internal components and in the case of a critical malfunction signal to the control circuit to make the device 101 safe and passive to the environment.

The componentry module 105 may further comprise electrical and communication contacts to interact with further components located in other modules. The contacts may be plugs which require active disconnection by a service technician or sprung contacts to allow different modules to be easily clicked or locked together.

Figure 8:
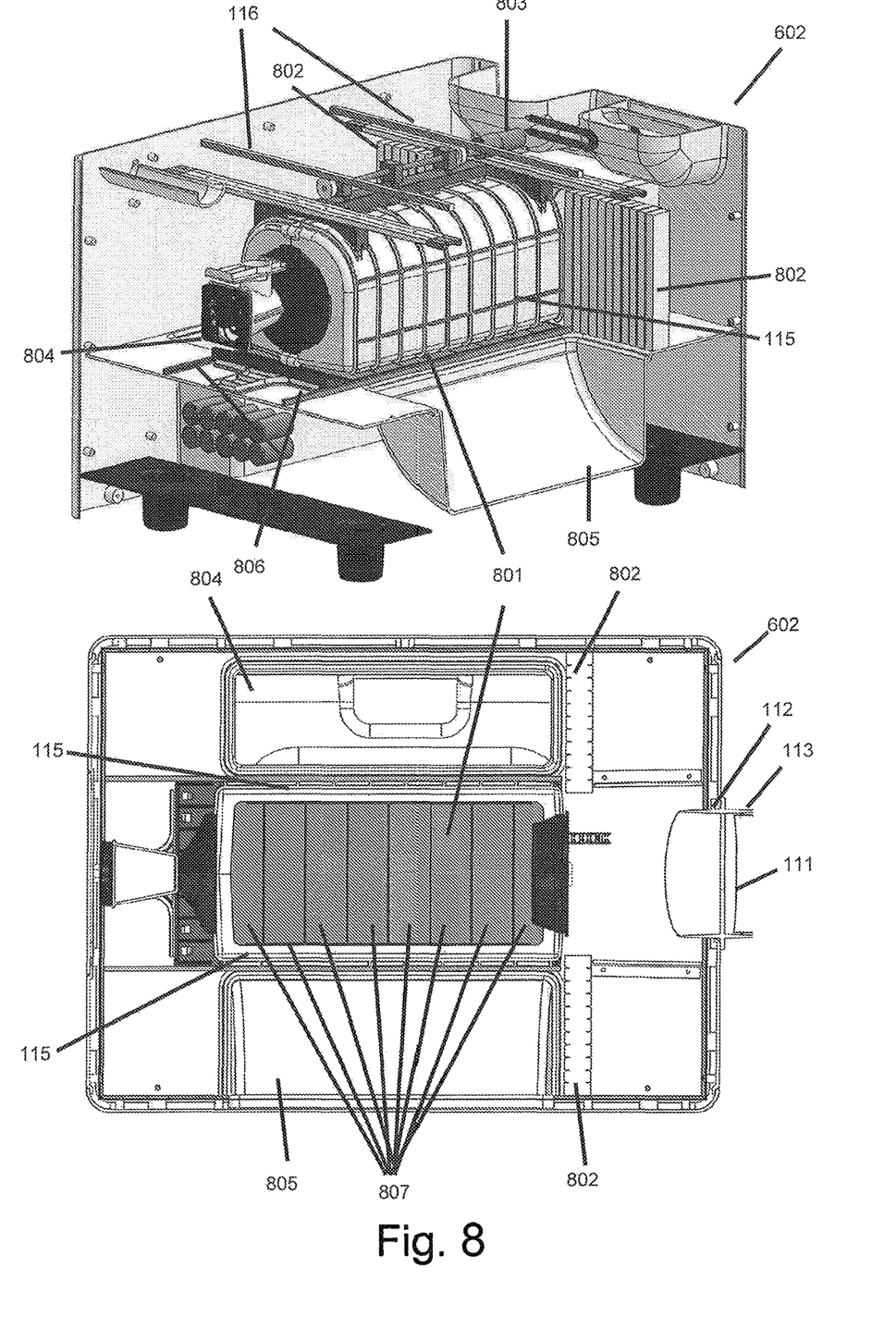
FIG. 8 depicts cross section and plan views of a dispatching chamber.

With reference to FIGS. 1 and 8, a dispatching module 110 comprises a cuboidal housing designed to cooperatively fit with the componentry module 105 such that the two modules when connected for a substantially unitary device 101. The dispatching module 110 comprises an entrance 111 to receive an entrant. The entrant may be any mobile creature in the surrounding environment who is lured or stumbles into the device 101. The entrance 111 may comprise a socket 112 to receive an entrance extension 113 such as a tube or ramp to allow an entrant to climb up to the entrance 111. The tube may suitably lead to a buoyant pontoon. The pontoon may float in a liquid flow (such as sewer effluent) providing a platform for a pest, such as a rat to cling onto and climb up onto.

The dispatching module 110 comprises an entrant receiving plate 801 removed from the entrance 111 to the dispatching module 110. The location of the receiving plate 801 is to ensure that no service technician or person who stumbles upon the device may interact with the receiving plate 801 or dispatching apparatus. Furthermore, an aperture block 802 may be deployed between the entrance 111 and the receiving plate 801 to mechanically separate the entrance 111 from the plate. The aperture block 802 may suitably be a set of bellows that expand to fill the passageway between the entrance 111 and the plate 801. A labyrinth 114 may be situated immediately inside the entrance 111 to separate the entrance 111 and receiving plate 801.

The receiving plate 801 is constructed from any suitable electrical conductor, is connected to weighing and electrocution apparatus, and is provided with connections to the control circuit board. The receiving plate 801 therefore weighs the entrant and is capable of administering a fatal electric shock to a pest.

Figure 9A:
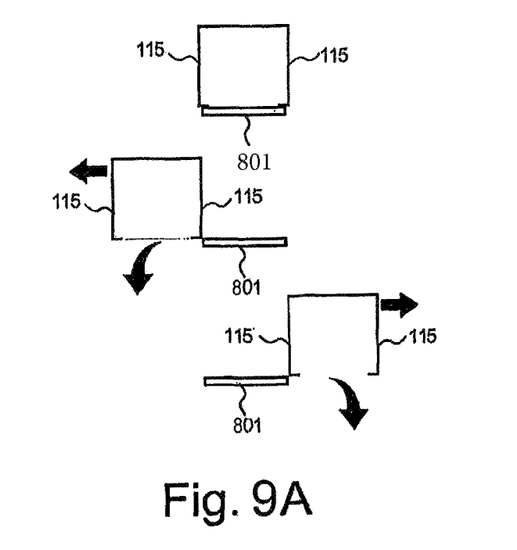
FIG. 9 depicts the method of action of various animal sorting mechanisms.

With reference to FIGS. 1, 8 and 9A, surrounding the plate 801 is a pair of paddles 115 slidably mounted to a pair of rods 116 which run the length of the dispatching module 110. The pair of paddles 115 are connected to a motor 803 by a rack and pinion system (or any other suitable means of connection, such as but not limited to a belt and pulley). The paddles 115, driven by the motor 803 and rack and pinion, move laterally across the receiving plate 801 and are therefore able to shove an entrant either to the left or right of the receiving plate 801 and through an aperture (or pair of apertures 804, 805) located in the base of the dispatching module either side the receiving plate 801.

A hopper module 117 comprises a cuboidal housing designed to cooperatively fit with the dispatching module 110 such that the componentry 105, dispatching 110 and hopper 117 modules when connected form a substantially unitary device 101.

The hopper module 117 has a dividing wall 118 which divides the container 117 into two sections. The first of these sections 119 is an enclosed void space for the collection of dispatched pests which are shunted by the paddles 115 in the dispatching module 110 through a given aperture (for example, the right hand aperture).

The second section 120 comprises a substantially J shaped chute 121 leading to an aperture 122 in a wall of the hopper module housing. Entrants which are not considered pests are shunted by the paddles 115 in the dispatching module 110 through a different aperture in the dispatching module 110 (for example, the left hand aperture) and ejected via the chute 121 out of the device 101.

The paddles 115 may be fitted with wiping blades to clean the electrification plate 801 as the paddles 115 pass over it.

The hopper 117 may be constructed to accommodate a significant number of dispatched pests, for example at least 50.

The hopper module 117 is equipped with adjustable feet to allow the device to be placed level upon an uneven substrate.

Alternatively, instead of a hopper 117, a collection bag may be used instead to collect the carcasses.

If the device 101 is located in an environment where carcasses may be readily disposed of (for example washed away in flowing water), then no collection device 117 may be necessary (hopper or bag) and the carcass dropped from the bottom of the device 101 into the local environment.

Figure 2:
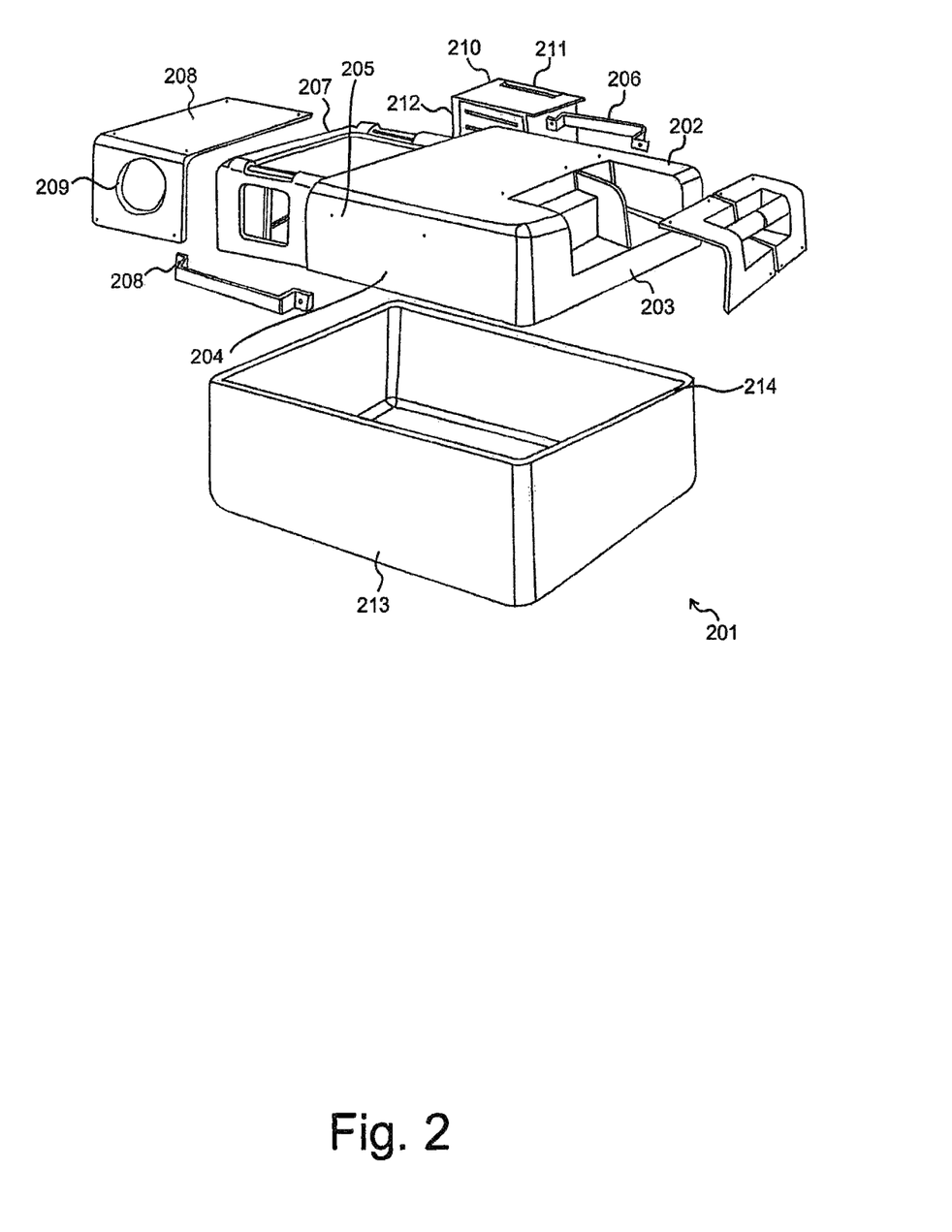
FIG. 2 depicts an exploded view of a second embodiment of the present invention.

Referring the FIG. 2 there is depicted a second embodiment of the present invention 201. Here the dispatching and componentry modules are combined into a single control module 202. This allows the device to benefit from a reduced form factor for fitting into smaller spaces. Additionally a service technician need only remove the one module 202 to service all the internal components of the device 201.

The housing 203 is constructed from a durable polymer or metal plates to allow easy replacement should the housing 203 become damaged.

The control module 202 can be designed to split into two separate modules to allow the componentry module 204 to be simply swapped with a freshly serviced unit. This allows the device 201 to be put back into operation in the minimum amount of time and the old componentry module which requires servicing to be taken away and serviced at a distribution centre.

External mounts 205 on the housing 203 allow handles 206 to be fitted to the exterior to allow easy transportation of the unit 201. Alternatively, a cradle (for example, formed of sheet metal) can be attached allowing the unit 201 to be suspended via poles as per the first embodiment.

The end of the control module 202 containing the dispatching module 207 comprises a removable cover 208 to allow easy cleaning and service of the dispatch module's contents.

The dispatch module 207 is arranged and functions as previously described, but with the addition of aperture blocks which can selectively obstruct the entrance 209 or dispatch chamber apertures to prevent an entrant leaving during dispatch or to guide a non-pest to the correct exit.

A bait module 210 is attached to a rear of the dispatch module 207. The bait module 210 is designed for easy removal and refill and comprises a handle 211. The bait module 210 comprises a cuboidal housing with a slatted door 212 to allow the scent of the bait to permeate. Distribution of the bait scent may be facilitated by a suction fan located within the componentry module 204 to draw the scent through the modular housing.

A hopper module 213 comprises a cuboidal housing designed to cooperatively fit with the control module 202 and has features as previously described with the addition of a rim 214 located at an upper internal edge to allow easy attachment of a collection bag. Dispatched pests are dropped straight into a bag held within the hopper 213 allowing a technician to collect and dispose of the sacrifices without contacting the bodies.

Figure 3:
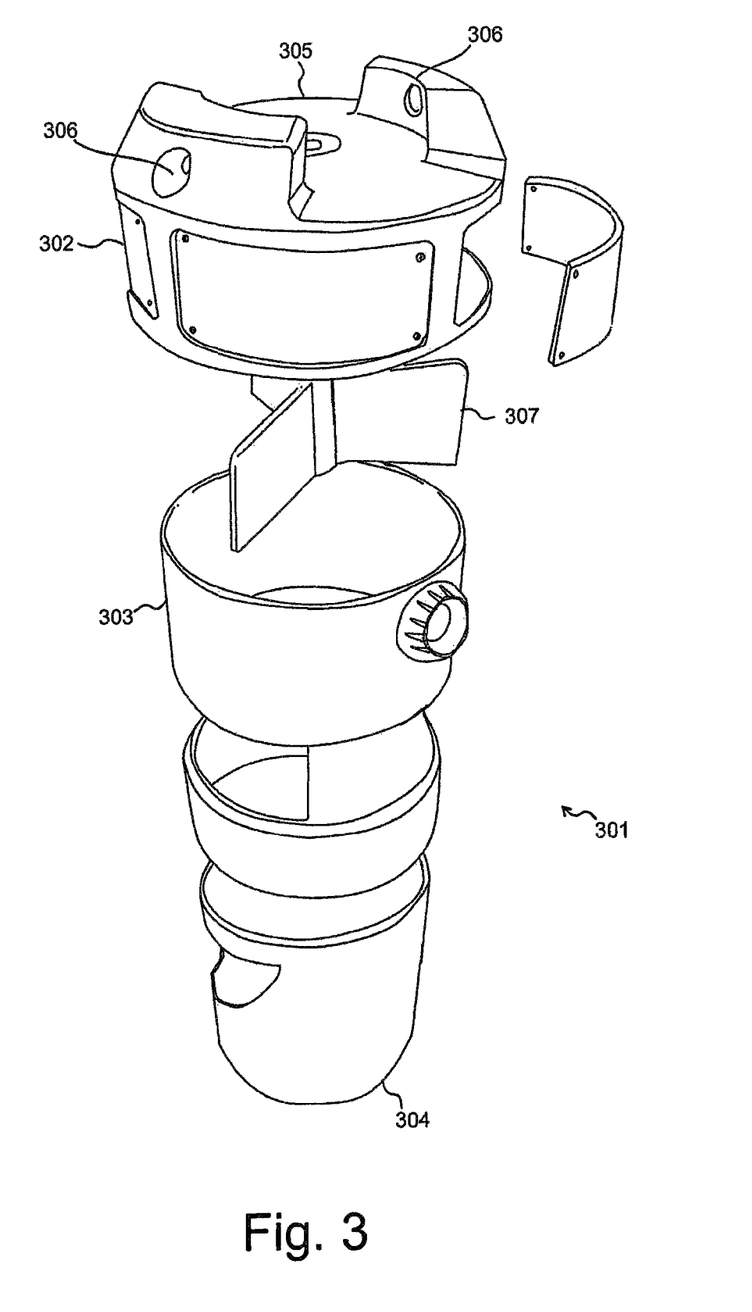
FIG. 3 depicts an exploded view of a third embodiment of the present invention.

With reference to FIG. 3 there is depicted a third embodiment of the present invention 301. Here the modules are substantially cylindrical and stack together to form a barrel suitable for locating in environments favoring a tubular shape, such as garbage disposal. The componentry 302, dispatching 303 and hopper 304 modules are as previously described save for the following differences.

The bait module is integrated as an internal part to the componentry housing 305, therefore only requiring one module to be removed for a service technician to service and rebait the device 301. The componentry module housing 305 comprises eyelets 306 arranged on the top of the housing 305 to allow a carry handle to be fitted or for the device 301 to be suspended on a pole.

Figure 9B:
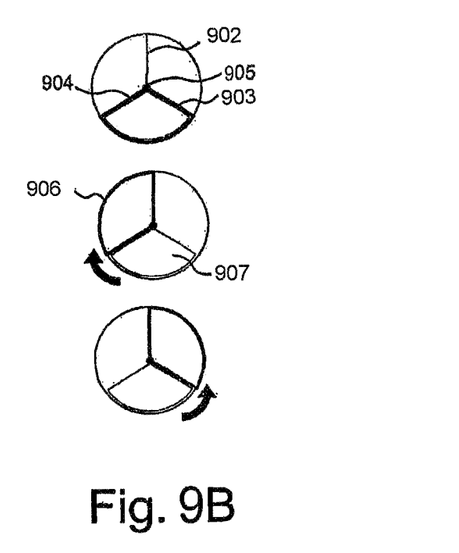

With reference to FIGS. 3 and 9B, the dispatching module 303 comprises a turnstile paddle system 307 with three paddles 902, 903, 904 connected to a central spindle 905 which rotates to urge an entrant clockwise or anticlockwise about a central axis of the device 301. It will be apparent that more or less paddles may be used and that the turnstile 307 may be located off-centre of the central axis of the device. Depending on the direction of rotation, an animal within the device 301 is urged either to an exit 906 or for disposal 907 in a hopper 304.

Figure 4:
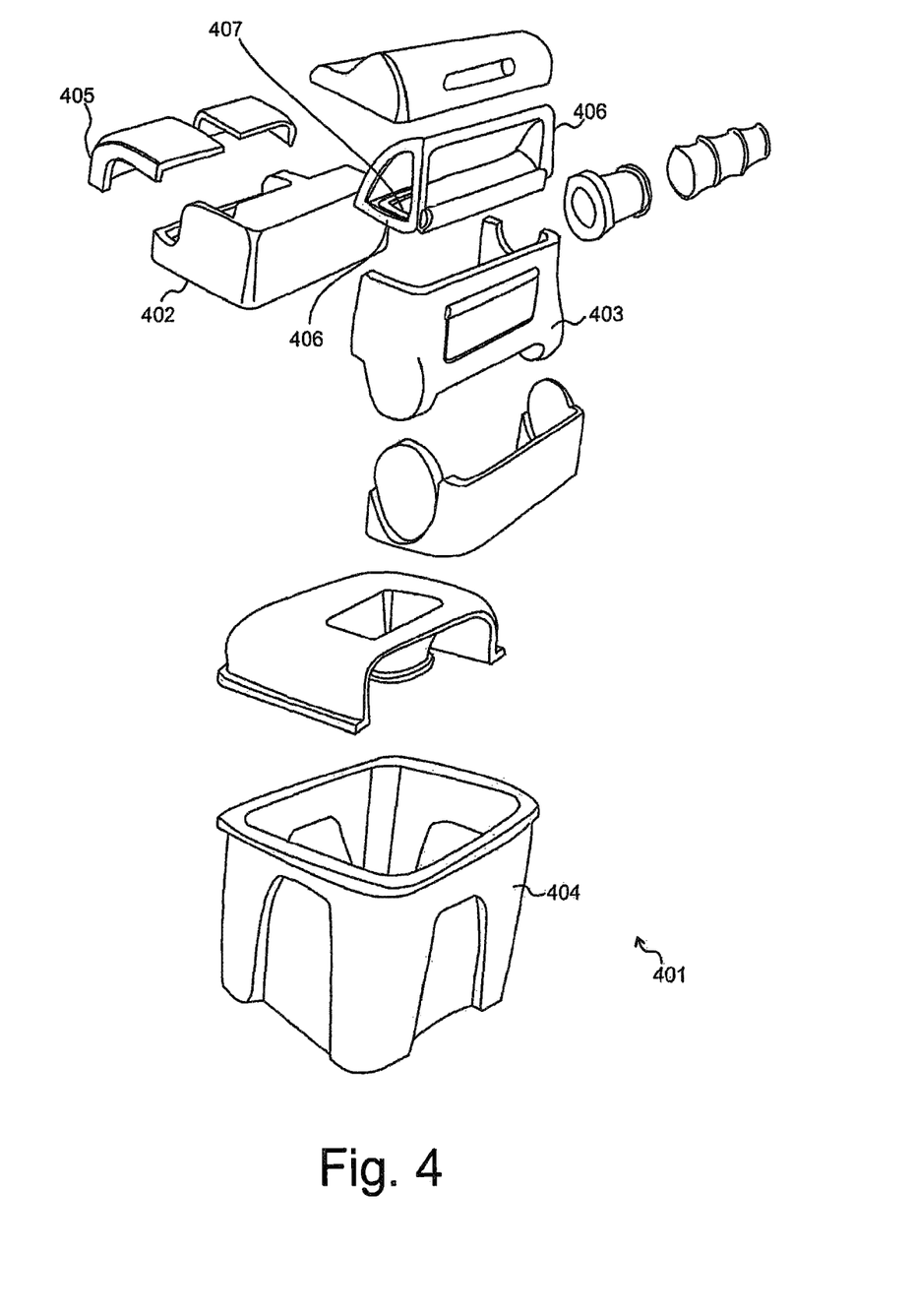
FIG. 4 depicts an exploded view of a fourth embodiment of the present invention.

With reference to FIG. 4 there is depicted a fourth embodiment of the present invention 401. The componentry 402, dispatching 403 and hopper 404 modules are as previously described save for the following differences.

The componentry module 402 is located adjacent the dispatching module 403. The housing 405 comprises O-ring seals to ensure the components within are not exposed to the environment the device is located.

Figure 9C:
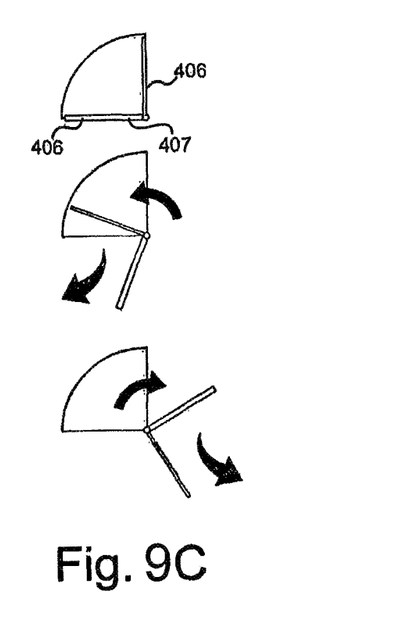

With reference to FIGS. 4 and 9C, the dispatching module 403 comprises a pair of rotating paddles 406 that rotate about a substantially horizontal axis. The paddles 406 are arranged perpendicular with respect to each other. The electrification and weighing plate 407 is arranged upon one the paddles 406.

The componentry 402 and dispatch 403 modules are hingedly attached to the hopper module 404, thereby allowing a "lid" (composed of the aforesaid modules) to be opened and the hopper 404 to be emptied, such as by removal of a pre-placed sack lining the hopper 404. A lock may be provided to latch the hopper 404 and "lid" together to prevent unauthorised access.

Figure 5:
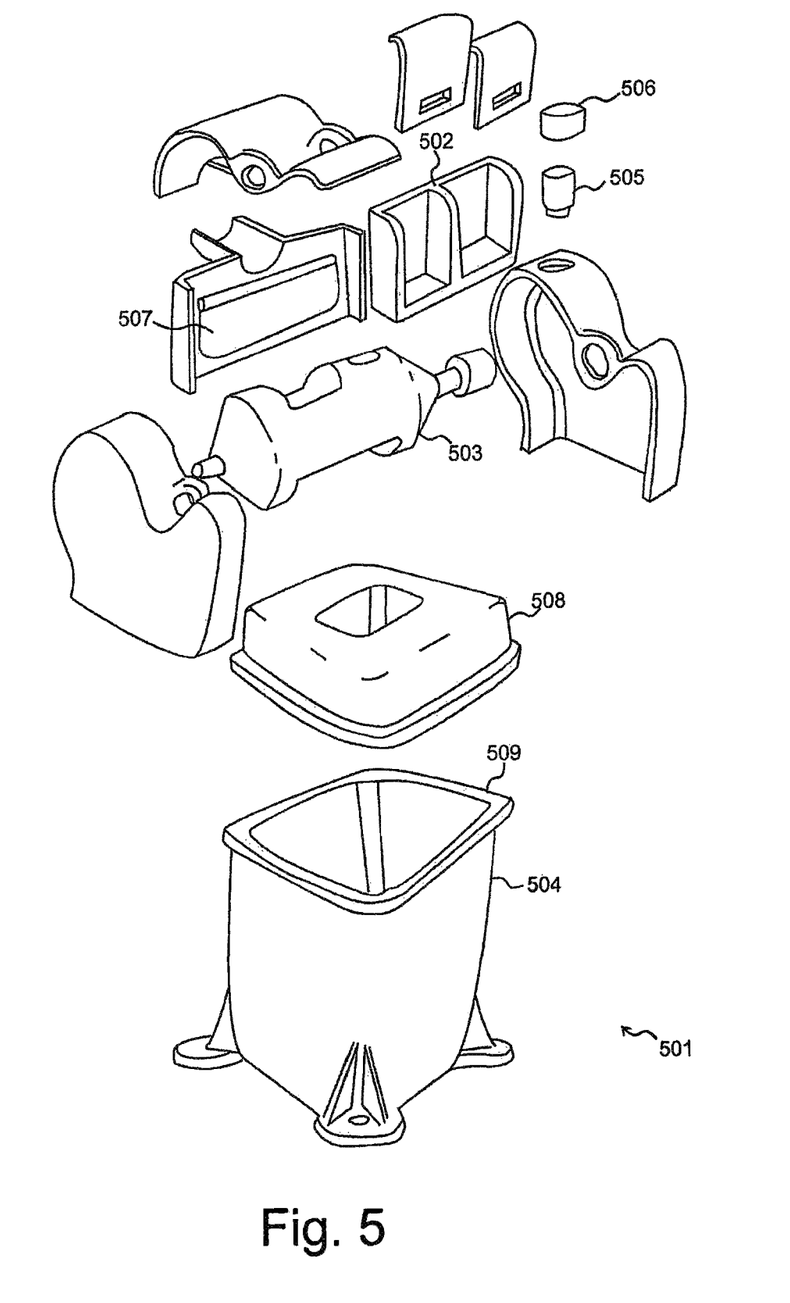
FIG. 5 depicts an exploded view of a fifth embodiment of the present invention.

With reference to FIG. 5 there is depicted a fifth embodiment of the present invention 501. The componentry 502, dispatching 503 and hopper 504 modules are as previously described.

The bait module 505 is located beneath a cap 506 (such as, but not limited to, a screw cap) for easy access for refilling.

Figure 9D:
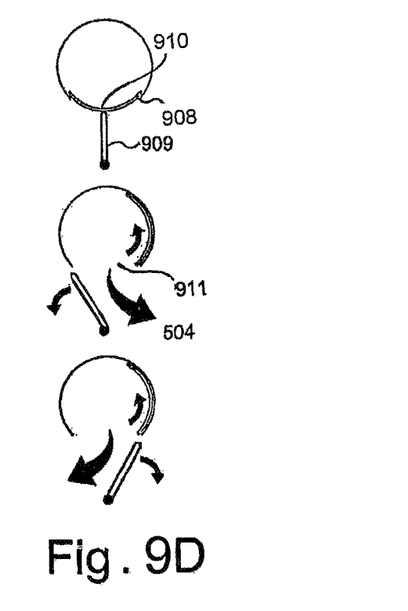

With reference to FIGS. 5 and 9D, the dispatching chamber 503 comprises a rotating platform 908 located above a rotating paddle 909. The rotating platform 908 comprises the weighing and electrification plates 910.

Once the device 501 has determined the entrant is a pest and dispatched the pest, or that the entrant is a non-pest, the platform 908 rotates, dropping the creature through an aperture 911 in a floor of the chamber 503.

The paddle 909 is located immediately below the chamber 503 and may sit in one of two positions. The first position directs the falling dispatched pest to the hopper module 504 for safe disposal. The second position directs the falling non-pest towards an exit 507 of the device and back into the local environment.

The hopper module 504 comprises a top 508 and a bottom 509 section. The top section 508 releasably attaches (for example, by clips) to the 3C bottom 509 storage portion. A collection sack may be secured between the top 508 and bottom 509 section and the two sections are clipped together.

Figure 6:
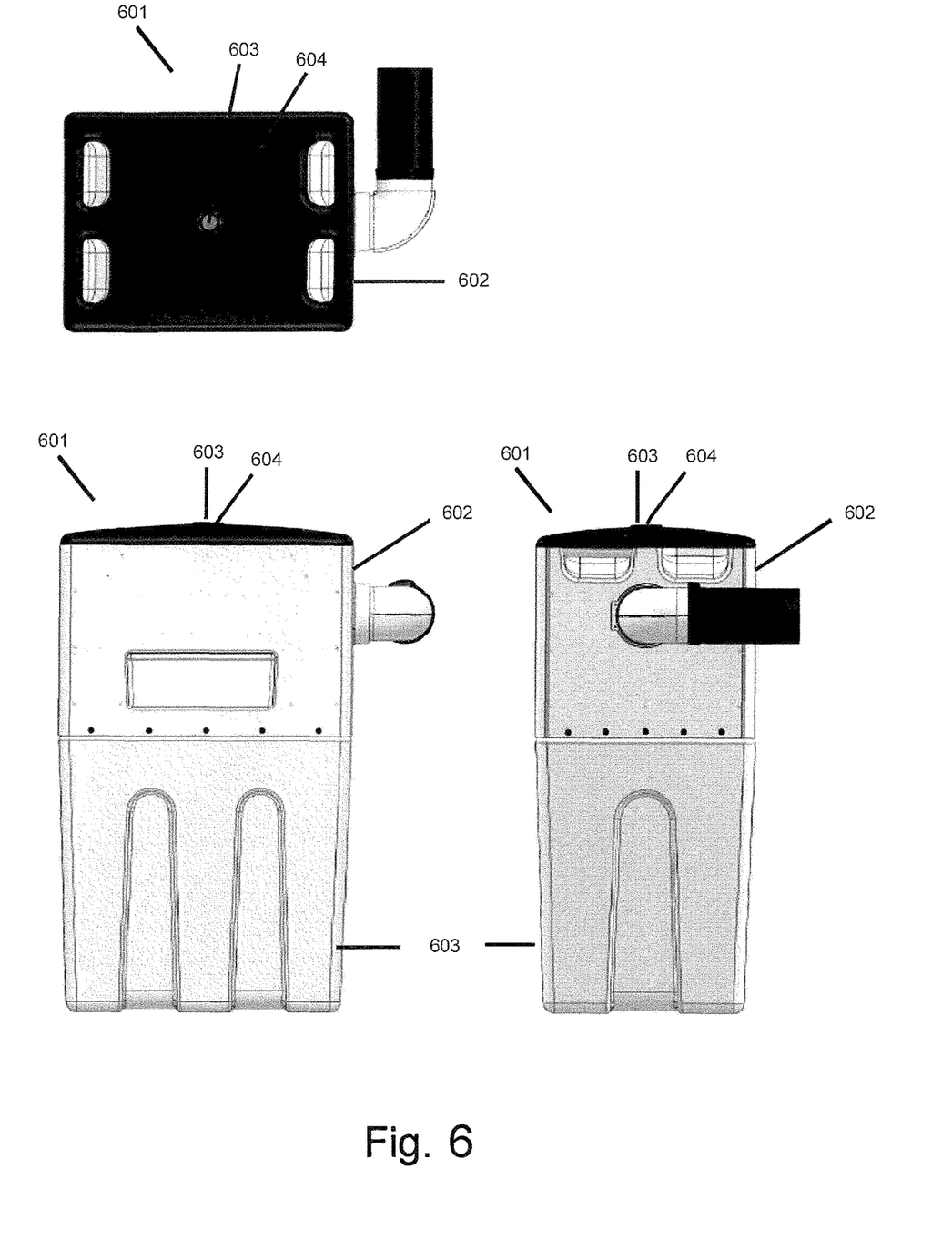
FIG. 6 depicts a top, first side and second side view of a sixth embodiment of the present invention.

With reference to FIG. 6 there is depicted a sixth embodiment of the present invention 601. The componentry, dispatching, and bait modules are combined into a single unit 602. The unit 602, hopper 603, their contents, and function is, save for the below, as previously described.

The unit 602 is provided with an environmentally sealed panel (not shown) to protect the internal components from exposure to its environment. The panel, once removed, allows access to the bait chamber, batteries, control circuit, and dispatch mechanism.

The unit 602 is provided with a spirit level 603 and LED indicator 604 light in the form of a halo. The LED indicator light 604 conveys an operational status of the device, such as battery charge or hopper capacity (e.g. emitting a red light for a full hopper or any suitable colour/setting combination).

The dimensions of all the embodiments herein are of the order of 600 mm×800 mm×1330 mm (w×d×h). The hopper 603, if provided with a tapering outer wall may terminate with a width and depth of the order of 548 mm×747 mm. Although it will be apparent any suitable dimensions may be substituted. The above dimensions are particularly representative of the sixth embodiment of the present invention.

Figure 7:
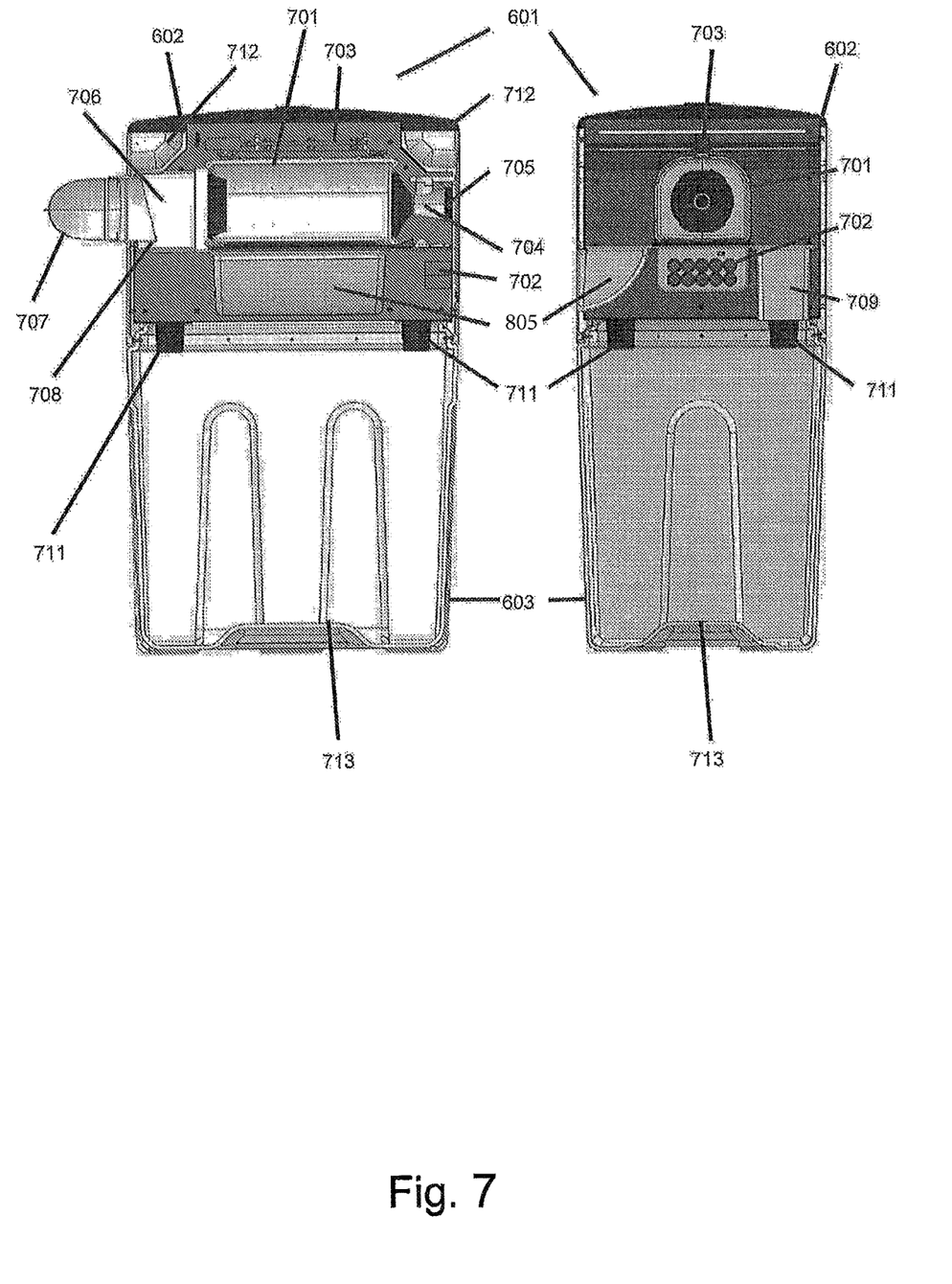
FIG. 7 depicts a cross section through first and second sides of a sixth embodiment of the present invention.

With reference the FIG. 7 the internal layout of the sixth embodiment of the device 601 is presented. The dispatching module 701 is located in the centre of the unit 602 with a battery pack 702 immediately beneath and the componentry module 703 immediately above. The bait module 704 is located towards the rear of the unit 602 and is in line with the centre of the dispatching module 701. A fan 705 is arranged adjacent the bait module 704 to push or pull scent through the unit 602 and to the outside to attract entrants.

Upon smelling the waft of bait, an entrant enters through an aperture 706 at an end of the unit opposite the bait module 704. The entrance 706 is through an elbow joint 707, suitably, but not exclusively formed from molded plastic. The elbow joint 707 ensures a 90° turn must be made before the unit 602 is accessed by an entrant and provides an additional safety barrier to prevent accidental access, for example, by human fingers. The elbow joint 707 suitably allows further tubing, such as flexible corrugated tubing to be connected. This allows the unit 602 to be placed in an easily accessible location, but the entrance of the unit to extend to an environment with a high pest concentration. A safety cut out switch is provided to detect when the tubing is connected to the unit 602. The unit 602 will only operate once the elbow joint or other tubing is connected.

The entrance 706 further comprises a step 708 into the dispatching chamber. The step 708 is shown as a step down into the chamber but may suitably be a step up. Furthermore, more than one step may be used. The step 708 prevents an entrant from backing out of the unit 602. Thus entrance into the unit 602 is one way.

Also provided in the unit 602 is an aperture 709 leading to the hopper 603 for disposal of dispatched pests. A second aperture 610 leads to the outside of the unit 602 to allow for ejection of non-pest entrants.

Feet 711 are attached to the base of the unit as well as integral handles 712 to allow a service technician to easily handle and set the unit 602 down during service.

The hopper 603 comprises a domed base 713 to prevent dispatched pests from piling in the centre of the hopper 603. This facilitates the efficient use of the space inside the hopper and maximises the hopper capacity.

Referring to FIG. 8 there is depicted isometric and plan views of the unit 602 of FIG. 6. Both the bait module 704 and dispatching plate 801 are slotted into rails 806 to allow easy removal for service, cleaning and rebaiting.

Bellows 802 are provided adjacent the entrance 111 of the unit 602 to prevent an entrant from leaving the dispatch chamber or to prevent a second entrant attempting to enter the dispatching chamber while it is occupied by a first entrant.

The dispatching plate 801 is split into segments 807, each segment 807 provided with weighing means, such as a strain gauge. This allows the device to determine the location of an entrant upon the plate 801. This ensures that the device only proceeds with determining whether the entrant is a pest or non-pest once the device has determined the entrant is fully located upon the plate 801.

Segmentation of the plate 801 has the further advantage that the device will not administer a killing shock to a pest until the pest is correctly positioned upon the dispatch plate 801.

Figure 10:
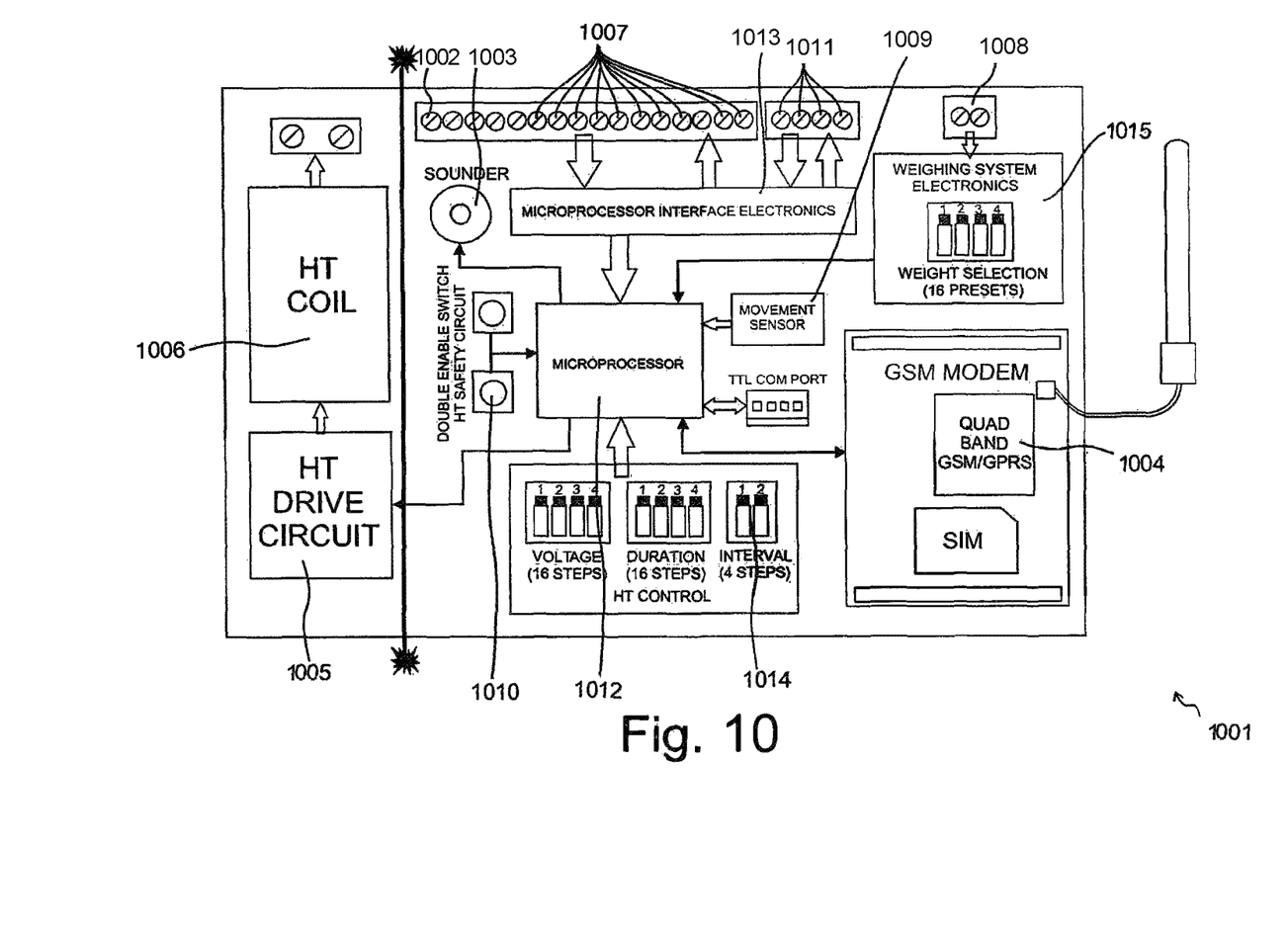
FIG. 10 is a schematic of the control system of the device.

With reference to FIG. 10 there is depicted a circuit diagram of the control circuit board 1001 which has the following components.

A power supply input 1002 for connecting to a power source such as a battery or mains power supply.

An alarm sounder 1003 to produce a sound upon a malfunction or to provide an alert that a service is required.

The control circuit board is provided with network connectivity 1004.

The communication network can be a Wide Area Network ('WAN'), an example of which is the Internet. The device may have wired communication emitting and receiving functionality over a wired Local Area Network ('LAN') conforming to the IEEE 802.3 ('Gigabit Ethernet') standard, wherein communication is performed as alphanumeric data using the Internet Protocol (IP), Hypertext Transfer Protocol ('HTTP') or Secure Hypertext Transfer Protocol ('HTTPS'), corresponding digital signals being relayed respectively to or from the device by a wired router interfacing the device to a communication network.

Alternatively, the network connection can be wireless communication emitting and receiving functions over a Wireless Local Area Network ('WLAN') conforming to the IEEE 802.11 ('Wi-Fi') standard, wherein communication is performed as alphanumeric data using the same IP, HTTP or HTTPS protocols, corresponding digital signals being relayed respectively to or from the device by a wireless router interfacing with the device.

In the further alternative, the network is a cellular telephone network configured according to any or all of the Global System for Mobile Communication ('GSM'), General Packet Radio Service ('GPRS'), International Mobile Telecommunications-2000 (IMT—2000, 'W-CDMA' or '3G') network industry standards, wherein the device receives or emits, text and/or image data encoded as a digital signal over a wireless data transmission.

The control circuit board further comprises a high tension drive circuit 1005 and coil 1006 for generating a preset high voltage to administer a killing shock to a pest located in the device.

A plurality of sensors 1007 are arranged or connected to the control circuit board, including but not limited to;
 1. A hopper fill sensor, to determine and monitor the fill level of the hopper.
 2. Respective hopper, dispatching and bait box switches, to determine each module is present and correctly connected.
 3. Weight input sensors 1008, to relay the weight of an entrant to the control circuit board.
 4. A movement sensor 1009 to determine when a creature has entered the device.
 5. A service token sensor, such as an iButton, a passive memory device containing a unique key to grant assess to the device or to set the device to a service mode.
 6. A humidity or water sensor to determine whether a subterranean device has contacted water or become submerged, whereupon the device may be set into a hibernation mode or shut down to minimise damage.

The control circuit board 1001 further comprises a high tension safety cut out switch 1010 to render the device safe if one of the sensors detects a malfunction or that the device is in a service condition.

The control circuit board 1001 is equipped with controllers 1011 to drive the operable elements of the device such as but not including, motors or solenoids driving the fan, paddles, and aperture blocks.

A microprocessor 1012 and interface electronics 1013 are located on the board in communication with the above components to relay incoming signals and produce an appropriate response.

A series of settable switches 1014 are located on the circuit board to allow variables including potential difference, shock duration, shock interval, and weight limit 1015 to be set. The switches are suitably dual inline package "DIP" switches offering multiple combinations of settings.

The control board periodically checks that no safety switches have been activated, that the battery contains sufficient charge to operate the device, and that the hopper is not full.

If one of the above conditions are false the control board emits an alarm. The device may be set to emit a different alarm for each condition affecting the device, such as short bursts for a low battery to alert a technician that a service is required. Alternatively an LED display or multicolour LED will illuminate a preset colour to indicate a battery charge state.

When a technician presents their token to set the device to service mode, the control circuit board disarms the trap and opens the aperture blocks to allow service.

With reference to FIGS. 1, 8, 9 and 10, when set, the device 101 operates as follows. An entrant approaches the device 101 and smells the bait within. The entrant then enters the device through the entrance 111, past the labyrinth 114 and onto the weighing plate 801. Sensing an entrant via the motion sensor 1009, the control circuit board 1001 operates an aperture block located at the entrance 111 and seals the entrant in. The entrant is then weighed 1008 and its mass compared against a preset value 1015.

If the entrant matches or exceeds the preset value 1015 it is determined to be a pest. The control circuit board 1001 electrifies the electrocution plate 801 and administers a preset voltage 1014 for a preset duration and optionally for a succession of shocks to ensure efficient dispatch of the pest. The control circuit board 1001 then activated the paddles 115 and urges the dispatched pest towards a first aperture leading to a collection hopper or alternative disposal.

If the entrant does not match or exceed the preset value 1015 it is determined to be a non-pest. The control circuit board 1001 activates the paddles 115 and urges the non-pest toward a second aperture 121 and out of the device 101. The control circuit board 1001, sensing the non-pest has left may move an aperture block to close the second aperture 121 to ensure the non-pest cannot re-enter the device 101.

The control circuit board 1001 then, providing no sensor 1007 detects a fault, re-sets all moving parts to their initial starting positions and readies the device 101 to receive a subsequent entrant.

The invention claimed is:

1. An animal sorting device comprising;
   a housing having an entrance, an exit, and an animal dispatch chamber, wherein the animal dispatch chamber comprises;
   entrant assessment means to determine if an entrant is either a pest or a non-pest; and
   animal dispatching means to dispatch the pest; and
   means to urge either;
   a dispatched pest towards an aperture or the non-pest towards the exit.

2. An animal sorting device as claimed in claim 1 wherein the urging means comprises a motor connected to at least one paddle.

3. An animal sorting device as claimed in claim 2 wherein the at least one paddle has a lateral motion of travel.

4. An animal sorting device as claimed in claim 2 wherein the at least one paddle has a rotatory motion of travel.

5. An animal sorting device as claimed in claim 1, wherein the entrant assessment means compares a characteristic of the entrant against a determining value.

6. An animal sorting device as claimed in claim 5, wherein the determining value may be adjusted.

7. An animal sorting device as claimed in claim 1, wherein the entrant assessment means is a weighing scales.

8. An animal sorting device as claimed in claim 1, wherein the dispatching means is an electrified plate.

9. An animal sorting device as claimed in claim 1, wherein the animal sorting device may be suspended immediately below a subterranean entrance.

10. An animal sorting device as claimed in claim 1, wherein the aperture is connected to a collection vessel.

11. An animal sorting device as claimed in claim 1, wherein the animal dispatching means, entrant assessment means, and means to urge are controlled by at least one microcontroller.

12. An animal sorting device as claimed in claim 11, wherein
    following a first run cycle, the at least one microcontroller resets the animal sorting device ready to commence a plurality of subsequent run cycles.

13. An animal sorting device as claimed in claim 11, wherein
    the at least one microcontroller adjusts an aperture block at least at the entrance, exit and aperture from a first open position to a second closed position prior to the animal dispatching means dispatching the pest.

* * * * *